Patented Oct. 12, 1943

2,331,868

UNITED STATES PATENT OFFICE 2,331,868

COLORED GLAZED COATED ROOFING GRANULES AND ROOFING SHEET MATERIAL SURFACED THEREWITH

George W. Swenson, St. Paul, Minn., assignor to Minnesota Mining & Manufacturing Company, St. Paul, Minn., a corporation of Delaware No Drawing. Application May 15, 1941,
Serial No. 393,674

5 Claims. (Cl. 117—100)

This invention relates to improved glazed granules, more especially of the type covered with a glaze containing a coloring matter, and while the invention is directed particularly to the treatment of naturally refractory materials with a colored glaze or the like, and the article per se, as well as a roofing material made with this article, it will be understood that this invention possesses a wide field of utility and may be adapted for analogous purposes.

The product of this invention may be incorporated as a coating for a roofing shingle or as an aggregate for incorporation in artificial stone such as cast stone and the like, and for the base granule there may be employed natural or artificial refractory substances, such as, for example, as quartz, quartzite, smoky quartz, cairngorm stone, sand, refractory stone, or limpid quartz crystal as the natural refractory substances; or, when coating temperatures and desired colors will permit, slate, crushed brick and other baked clay and similar material, porcelain, terra cotta or other ceramic wastes or cement compositions may be employed.

The finished product, that is to say, the natural or artificial refractory material, with a glazed coating, may be incorporated as a weather coating in a bituminously coated sheet, for forming roofing material either in rolls or in shingles, or may be incorporated in cast stone.

It is well recognized that many industries employing granular materials are handicapped in the use of colored granules, inasmuch as the existing available material, such as naturally occurring colored rock, does not give either a wide range of colors, nor are the colors of an attractive or permanent nature.

Heretofore efforts have been made to treat crushed mineral material with a color bound to the granule with an organic bond and this is unsuited for many uses, inasmuch as the colors are only relatively permanent, and the organic bond does not have the life or ageing characteristics, particularly where it is desired to use the granules in permanent materials such as cast stone and the like. Furthermore, in the case of cast stone, the organic bond on the granule prevents permanent adhesion between the granule and the matrix of the cast stone.

As an alternative, inorganic bonds have been experimented with and chief among those known to me are the type employing a sodium silicate as the base. In these methods and in the articles resulting therefrom the colors are contained in a sodium silicate colloidal dispersion, and the granules are then coated with this mixture. The coated granules are then fired to fix the color and the silicate bond to the granule. However, there are many defects in such granules which limit their possible use; included in these defects being the lack of strength of color and proper tone of color, permanence of color and coating when exposed to the elements, and the limiting of the range of colors available to be produced. Furthermore, these methods known to me are not capable of being carried out at a reasonable cost.

The principal objects and advantages of this invention reside in the provision of an improved article of manufacture, glaze coated granules, particularly of the colored type, which may be manufactured with a wide range of colors of extreme permanence; the provision of treated granules of the character referred to in which a good bonding action can be attained between the finished granulated material and other bonding materials; the provision of an improved granulated material to be employed as a weather coating on various objects which possesses a permanence of color not heretofore attained by the methods and in the articles known to me, and the provision of glazed granules in which I may be enabled to obtain certain desired color effects and to accomplish this purpose at a cost less than any of the prior methods known to me. The present invention further has as an object the provision of the approved method of manufacturing colored granulated material in which I am enabled to eliminate steps of previous processes known to me so as to reduce the initial cost of the manufacture of the product. This method, furthermore, permits of a more definite regulation of the color depth or intensity.

The present invention has as further objects the provision of an improved granulated finished article having a glaze which is permanent in its adherence to the granule, has the property of desired viscosity to facilitate manufacture, has a reactivity toward the base granule which helps in attaining the desired permanence of glaze and/or color; and the provision in such a granulated material of a glaze having an affinity for, and an ability to carry color in the necessary strength, and at the same time to possess suitable coefficients of expansion and contraction so that the glaze may be successfully employed on a wide range of different materials employed as the base granule.

This invention also has as one of its objects the provision of an improved method of preparing the improved glaze and applying the same to the granulated material to produce the colored granule and which will produce colored aggregates having high permanence of color and to accomplish this at a relatively low cost; the provision of an improved method of manufacturing colored granulated material in which the intensity of color may be regulated to a desired degree and to such an extent that the color and/or the glaze are not undesirably affected by any quantity of substance contained in the glazing material employed for enhancing the reaction between the glaze and the granule to which it is applied; and the provision of an improved method of manufacturing colored granular material in which the glazing effect of the coating applied to the individual granules is enhanced, even with the presence of a deep color in the glaze.

I have found that my improved method of coating granulated material permits of the production of colored aggregates wherein the glaze applied to the individual granules is one containing a coloring agent or pigment, and is substantially opaque, without, however, producing a dulling of the glaze, thus overcoming one of the principal disadvantages of the prior colored granulated material heretofore produced either by artificial methods or that found in natural deposits.

For the purpose of my invention, I have preferred to employ quartzite granules, inasmuch as quartzite is metamorphosed sand stone in which quartz particles are cemented with a siliceous cement, sometimes, but not always containing calcium carbonate and iron oxide. The porosity of quartzite is relatively low, due to the fact that the only possible porosity of quartzite is produced by the intervening portions of cement between the quartz grains, which is a relatively small part of the granule itself. Quartzite appears to possess a further characteristic of having an affinity for the glaze as applied thereto and particularly the quartzite granule appears to react on its outer surface with the glaze coating so that the coating is knitted firmly to the granule by the heat treatment which will be hereinafter described.

I am not prepared to state just what is the exact reaction between the improved glaze and the preferred granulated material quartzite, but it appears that quartzite is at least superficially dissolved by the molten glaze coating and reacts chemically with the material of the glaze by furnishing silica to form complex silicates, these silicates and the rest of the glaze being mutually soluble. It may be that part of the material such as the coloring agent is inert.

For convenience in describing the processes employed herein and as distinguishing them particularly from the sodium silicate dispersion methods known to me and the prior art, I term my improved process a direct or dry process in the sense that no sodium silicate slurry or dispersion of the glazing material is required and there is no pre-coating of the granules necessary in this direct or dry process. I may employ a fritted glazing material which may contain the desired ingredients which function as the fluxing agents such as borax, and the fritted material may also contain red lead, a silicate and chrome oxide or I may employ a powdered raw glaze of the desired composition.

In following the method of this invention, I may employ a furnace or kiln of any suitable capacity, having means for effectively agitating the mass during fusion of the glaze, into which is introduced any desired amount of the base granule and its proportional quantity of glaze up to the capacity of the furnace. After the introduction of the charge, the temperature is raised to a degree slightly above the fusing or melting point of the glazing material. Agitation is carried on from the time of charging to the time of discharge. For the carrying out of this process a rotary kiln or furnace may be provided and I have found this most suitable and convenient. This glaze contains the coloring material in desired proportions which can be of a predetermined ratio to the size of the individual granules and the amount of granulated material to be treated.

By pre-mixing the powdered glaze materials and the base granules, the mixture may be continuously fed into a furnace provided for continuous outflow. The continuous process thus set up allows a large saving in fuel and time.

The foregoing method may be carried out in a direct manner by a slight modification as follows:

The furnace is charged with the predetermined amount of base granulated material which it is desired to coat. Prior to applying heat to the furnace, a predetermined amount of color-bearing glazing material is distributed within the furnace substantially throughout the full area thereof, and the furnace is then rotated, or the granulated material and glazing material are otherwise thoroughly mixed. When the proper mix has been attained, heat is applied thereto at a temperature above the fusing point of the color-bearing glazing material, causing the glazing material to melt and flow upon the granulated material, the temperature employed being sufficient to set up a physical or chemical reaction, or both, between the granulated material and the glazing material, resulting in an even distribution of the glaze coating upon the individual granules.

In the case of the continuous process the mixed granules and glaze materials are fed in the furnace maintained at a predetermined temperature, where the glaze melts, spreads on the granule faces, superficially reacts with the granules, is discharged continuously from the furnace to the cooling system when the colored granule loses heat at a rate to have the finished product of high quality.

As an example of a suitable glaze coating containing coloring pigment, I submit the following formula:

| | Pounds |
|---|---|
| Red lead | 70 |
| Borax | 45 |
| Silica | 45 |
| Chrome oxide | 26 |

In this connection I wish to point out that satisfactory results have been obtained by employing sodium dichromate in the foregoing formula as the coloring agent, though, of course, it will be understood that this material is only suitable for producing a green glaze.

For some purposes the above formula has certain objections, namely, the presence of a lead material therein. In atmospheres containing hydrogen sulfide ($H_2S$) there is danger of the formation of black lead sulfide (PbS) which has a tendency to discolor the granule. A glazing material which does not possess the foregoing disadvantages may be made with the following formula:

| | Pounds |
|---|---|
| Borax | 57.2 |
| Potassium nitrate | 10.1 |
| Zinc oxide | 12.2 |
| Magnesium carbonate | 8.5 |
| Barium hydrate (anhydrous) | 8.6 |
| Silica fines | 45.0 |

To the above flux may be added any of the stains or colors used in the ceramic industry in sufficient amounts to give the intensity of color desired.

As an example of the proportions which I have employed to produce a successful finished article according to this invention, the following is submitted:

To one ton of the base granulated material, such as quartzite, of size suitable for roofing granules, I have added from 35 to 120 lbs. of color-bearing glazing material, having characteristics according to formulae presented hereinbefore. This mixture is subjected in a furnace to temperatures of from 650° C. to 1000° C., which are temperatures which permit of a more economical operation, though, for some purposes, I have employed a much higher temperature, such, for example, as temperatures as high as 1200° C. (about 2200° F.).

The foregoing formulae, it will be noted, possess one unique and valuable difference from the prior art glazing materials known to me and in regular use, in that I provide a much greater percentage of chromium oxide ($Cr_2O_3$), so that where it has been the practice to limit the chromium oxide contained to 10% as a maximum, I have found that from 16% to 25% of chromium oxide in the glazing material is not only possible but practicable and desirable.

It will be understood from the foregoing that the preferred process of producing coated quartzite granule may take any one of three major sequences of steps, and that these may be as follows:

(A) One process to involve charging a furnace with both granule and glaze previously mixed in proper proportions to produce the desired finished product; then, while agitating the two, apply heat above the melting point of the glaze to cause its even distribution over the surfaces of the granules (an alternative of this process which I at times find desirable to employ is to first charge the furnace both with the granule and glaze cold and agitate in order to thoroughly mix the same and then, after the mixture is completed, apply heat at a temperature above the melting point of the glazing material).

(B) A further alternative process, which for convenience may be designated as a Second Process, includes the steps of (a) charging the furnace with the granule alone and applying heat thereto slightly below the melting point of the glazing material and then (b) adding the glaze to the charge in the furnace and at the same time, or immediately thereafter, increasing the temperature slightly above the melting point of the glaze, while continuing agitation throughout. In this procedure the heat may be discontinued or shut off before adding the glaze and then proceeding as stated.

(C) A still further process, which may be designated for convenience as a Third Process, includes the steps of (a) charging the furnace with the granule while agitating, and heating the same slightly above the melting point of the glaze and then the step (b) adding the glaze thereto in desired and proper proportions and maintaining the temperature above the melting point of the glaze while agitating throughout.

As a further alternative method of coating refractory granulated material, I have had success in employing a powdered glaze bearing the proper color, and mixing the same with a vehicle, preferably non-aqueous, such as a low cost oil, a suitable oil being fish oil or varnish maker's gloss oil, mixing the two to a fairly smooth consistency to form a paste. I then mix a predetermined amount of such paste with a proper amount of base granules to be coated until they are uniformly coated with this paste. The whole mass is then heated to burn off the oil and fuse the glazed coating onto the individual granule. I have been able to produce a satisfactory color-bearing coating or glaze and have found this method to have a fairly general application and to attain a desirable strength and permanence of color and to permit desirable variations to suit different conditions.

As a refinement of the processes above referred to, I wish to point out that I may employ, as a fifth process, a prepared fritted glaze having a low viscosity when in a molten condition. This process I term a dry direct batch type, and the steps are as follows:

A quantity of the granulated mineral material such as quartzite may be charged into a rotary batch type furnace and the charge leveled off by rotating the furnace. The glaze is then loaded evenly throughout the length of a trough, the latter introduced into the furnace and dumped to give even distribution of the glaze throughout the length of the furnace. The furnace is then again rotated and a fire started so that a relatively low temperature is imparted to the mass of material contained in the furnace. This preliminary heating and the rotation distributes the glaze powder throughout the mass of granulated material. The fire is continued and, when the temperature is raised above the melting point of the glaze, the latter assumes a liquid condition, and by the accompanying agitation, is uniformly coated over the surfaces of the quartz or other mineral granules.

One of the principal objects of this process is that the two operations required for mixing the glazing materials in a slurry, and consequently introducing this paste into the furnace, are eliminated, and an additional advantage is that a relatively short processing time is required.

As an alternative of the methods herein disclosed, and which I may term a sixth method, is what may be considered as a dry, direct and continuous method, and its steps may be as follows:

Granulated quartz or quartzite and a dry powdered glaze are mixed together in a concrete mixer. This mixture is continuously charged into a rotary furnace which latter is tilted so as to discharge continuously at its opposite end. When the furnace has been charged from the concrete mixer, heat is applied at a sufficient degree to fuse the dry powdered glaze onto the individual granules so that they, with a coating of this glaze, are continuously discharged from one end of the furnace. The furnace is of sufficient size so that, if desired, the first steps may be eliminated, that is to say, the mixing of the granulated material and the dry powdered glaze may take place in the furnace itself. In the process carrying out these steps the coated and hot granulated material as it is discharged from the furnace is introduced into a rotary cooling apparatus which continues the agitation and prevents the individual granules from becoming joined when the coating is cooling. The advantage of this system is that it permits of a continuous process which allows for better economy and a more accurate control of the product resulting. No premixing is requisite to the success of this process, and the time of processing is materially shortened. The fine particles of dust which may arise from the fritted glaze employed can be withdrawn by a suitable suction apparatus.

From the foregoing it will be observed that the components entering into the reaction for the production of the glazes, which have a high degree of resistance to atmospheric deterioration, involve the employment of an oxygen compound of boron forming a weather-resisting borate or borosilicate glaze. The oxygen compound of boron availed of may, therefore, be the readily available form of this compound containing the boron-oxygen radical, i. e., boric oxide. Though the invention is not so limited, an important specific compositional phase of the present invention involves the use of an alkaline earth metal oxide-bearing material, e. g., barium and/or magnesium and/or calcium oxides, carbonates, etc., as a reactant in the glaze-forming coating composition comprising boric oxide and preferably also a siliceous material such as silica. Other ingredients may also be present in suitable amounts, including $Na_2O$, $ZnO$, etc., as heretofore illustrated. The ratio of the boric oxide to the basic metal oxide content of the glaze should be restricted and, as illustrated hereinabove, ratios of about 0.6 or 0.55 and less are advantageous in securing glaze coatings of weather-resistant character.

From the foregoing it will be observed that I am enabled to produce a colored coated mineral granule having the desired color content and possessing a high degree of resistance to deterioration under weather conditions, and that I am enabled to vary the processing of the granulated material to suit conditions desired so that the coated granules of various qualities and characteristics may be produced within reasonable economies desired.

This application is a continuation-in-part of my application Serial No. 647,967, filed December 19, 1932. Reference is likewise made to my application Serial No. 647,966, filed December 19, 1932, and my application Serial No. 717,851, filed March 28, 1934, directed to related subject matter.

What I claim is:

1. As a new article of manufacture, artificially colored decorative roofing granules comprising dense, refractory quartzitic base granules coated with a fused weather-resistant non-blooming glaze coating of green color prepared by heating a glaze composition in situ on surfaces of the granules, said coating comprising a basic metal boro-silicate glaze having a mol ratio of $B_2O_3$ to the basic metal oxide content of said coating which is substantial, but not greater than approximately 0.6, said glaze coating being substantially free of water-soluble alkali material and having a green chromium oxide disseminated therein as a coloring agent, said basic metal including magnesium.

2. A composite sheet body for roofing and like purposes comprising a plastic stratum and an adherent surface coating for the same consisting of colored coated granular material, individual granules of which are as defined in claim 1.

3. As a new article of manufacture, artificially colored decorative roofing granules comprising dense, refractory base granules coated with a fused weather-resistant, non-blooming glaze coating of green color prepared by heating a glaze composition in situ on surfaces of the granules, said coating comprising a basic metal boro-silicate glaze having a mol ratio of $B_2O_3$ to the basic metal oxide content of said coating which is substantial but not greater than approximately 0.6, said glaze coating being substantially free of water-soluble alkali material and having a green chromium oxide disseminated therein as a coloring agent, said basic metal including an alkali metal, barium and magnesium.

4. As a new article of manufacture, artificially colored decorative roofing granules comprising dense, refractory base granules coated with a fused weather-resistant, non-blooming glaze coating of green color prepared by heating a glaze composition in situ on surfaces of the granules, said coating comprising a basic metal boro-silicate glaze having a mol ratio of $B_2O_3$ to the basic metal oxide content of said coating which is substantial but not greater than approximately 0.6, said glaze coating being substantially free of water-soluble alkali material and having a green chromium oxide disseminated therein as a coloring agent, said basic metal including barium.

5. A composite sheet body for roofing and like purposes comprising a plastic stratum and an adherent surface coating for the same consisting of colored coated granular material, individual granules of which are as defined in claim 4.

GEORGE W. SWENSON.